Jan. 30, 1940. E. A. KEELER 2,188,754
MEANS FOR INDICATING DEFECTS IN THREADS
Filed Dec. 29, 1936 3 Sheets-Sheet 1

INVENTOR.
EARL A. KEELER
BY George W. Munchamp
ATTORNEY

Jan. 30, 1940.  E. A. KEELER  2,188,754
MEANS FOR INDICATING DEFECTS IN THREADS
Filed Dec. 29, 1936  3 Sheets-Sheet 2

INVENTOR.
EARL A. KEELER
BY George M. Musehamp
ATTORNEY

Jan. 30, 1940.          E. A. KEELER          2,188,754
MEANS FOR INDICATING DEFECTS IN THREADS
Filed Dec. 29, 1936          3 Sheets-Sheet 3

INVENTOR.
EARL A. KEELER
BY George M. Wunschauf
ATTORNEY

Patented Jan. 30, 1940

2,188,754

UNITED STATES PATENT OFFICE 2,188,754

MEANS FOR INDICATING DEFECTS IN THREADS

Earl A. Keeler, Norristown, Pa., assignor to The Brown Instrument Company, Philadelphia, Pa., a corporation of Pennsylvania Application December 29, 1936, Serial No. 118,095

12 Claims. (Cl. 73—51)

This invention relates to the detection of defective filaments in a thread.

A primary object of the invention is to provide simple and efficient means for detecting defective filaments in a thread, together with means actuated thereby for indicating the presence and/or recording the number of such imperfections.

A further object of the invention is to provide simple and efficient means for detecting defective filaments in a plurality of threads simultaneously, together with means actuated thereby for indicating the presence and/or recording the number of imperfections in all the threads on a single recording means.

A still further object of the invention is to provide simple and efficient means for detecting defective filaments in a plurality of threads, together with a single means responsive to the plurality of detection means for indicating the presence and/or recording the number of imperfections in the threads, the said single means being adapted to be controlled by each of the detection means in succession.

In the manufacture of fabrics from rayon or other threads, the presence of defective filaments in the individual threads shows up in the finished material in the form of fuzzy ends. Heretofore, in order to eliminate these fuzzy ends, provisions have been made for the inspection by observation of a portion of the threads during transfer of the thread from spool to spool and rejection of any spools having an excessive number of defective filaments. This inspection operation is obviously expensive, and more important, from the standpoint of producing quality material, is inadequate by virtue of the fact that only a small proportion of the total output can practically be inspected. The filaments, which it is the purpose of this invention to detect, are extremely fine and delicate in nature which will be readily appreciated when it is understood that rayon threads, for example, which themselves are extremely fine and small in diameter, are made up from 40 to 100 or more of such filaments.

By means of my invention the manual inspection operation referred to may be dispensed with and defective thread filaments may automatically be detected and indicated or recorded, as desired. As one means for such automatic detection, I employ a delicate switch member arranged in the path of the thread which is actuated when engaged by the fuzz or broken filaments of the thread, as the thread is transferred from one spool to another. Impacts of the moving fuzz projections on the delicate switch member, which has little inertia, results in the closure of a contact to thereby energize an electrical circuit connected to suitable indicating means or recording means for making a mark on a recorder chart whenever a fuzz projection strikes the switch member. In alternative embodiments of the invention, closure of a contact by impact of fuzz on the delicate switch member may be employed to energize a neon signal tube or a cathode ray tube.

In a further embodiment of the invention repeated impacts of fuzz on the delicate switch member may be employed to charge a condenser and to thereby provide a basis for measurement of the number of impacts by a totalizing discharge method to be described.

In another embodiment of my invention provision is made for charging the moving thread to a high potential and passing it through a loop small enough in clearance to permit the fuzz to touch the loop and thereby impart a charge to the latter, which may be utilized to control, through a sensitive electrical circuit, recording or indicating means.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Figure 1:
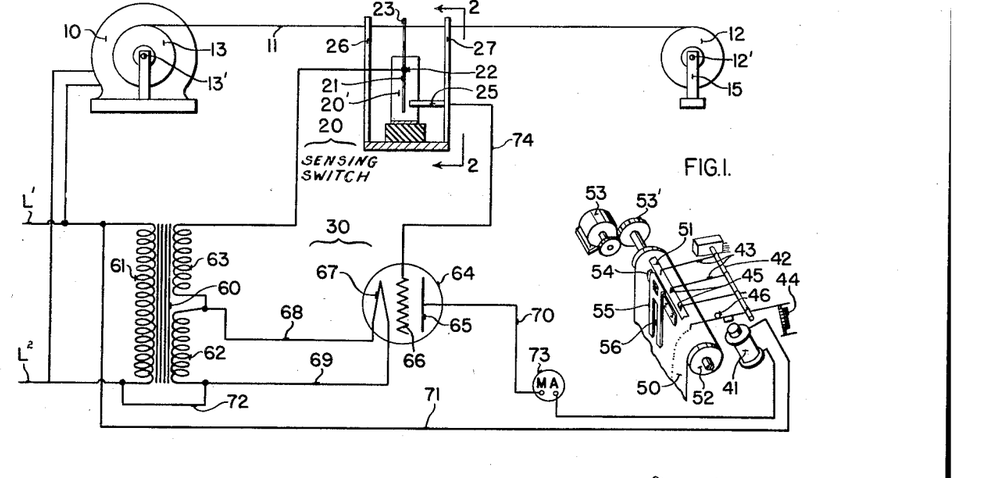
Fig. 1 is a more or less diagrammatical view illustrating one form of the invention.

Referring first to Fig. 1, provision is made as illustrated for arranging a detector 20 in the path of the moving thread for detecting the presence of defective filaments in the thread. Normally, in practice, the detector 20 may desirably be arranged in the path of the thread as it is being unwound from a spindle on the spinning machine and reeled on a bobbin immediately after the spinning operation. For clarity and definiteness of illustration, however, I have shown more or less diagrammatically, the thread 11 as being unwound from a spool 12 and reeled on spool 13, the latter being mounted for rotation on a shaft 13$^1$, driven through suitable gearing, not shown, by a unidirectional electrical motor 10 energized for rotation from alternating current supply lines L$^1$ and L$^2$. The spool 12 is mounted for rotation on a shaft 12$^1$ which may be disposed on suitable brackets 15 in any convenient manner. Preferably, both spools 12 and 13 are so mounted for rotation as to facilitate quick removal and replacement by other spools.

Figures 2, 3, 4, 5, 8A:
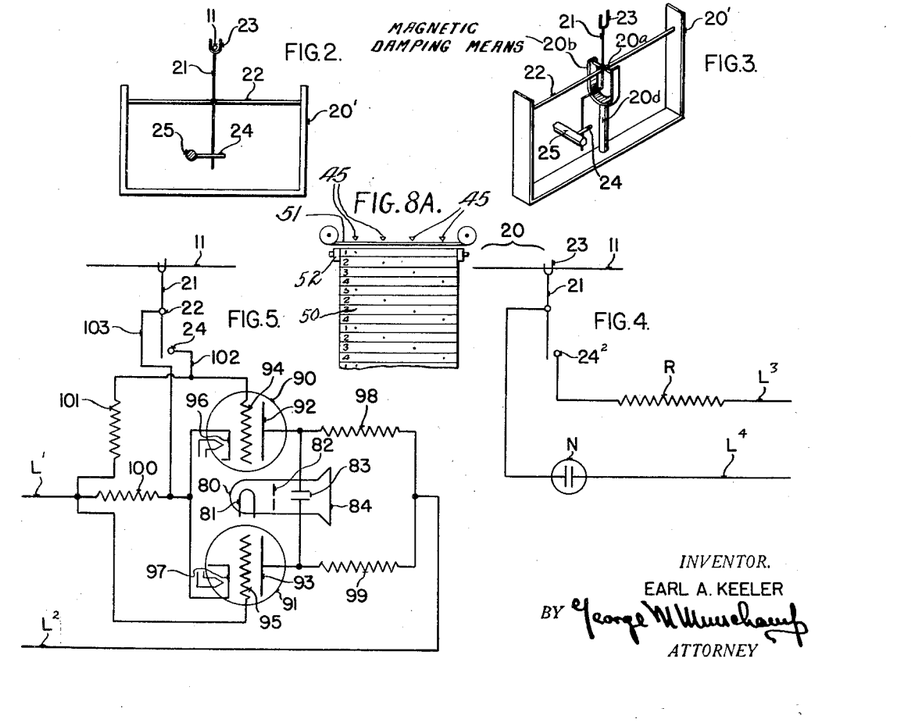
Fig. 2 is an end elevation of the contacting switch member shown in Fig. 1, shown as viewed in the direction of the arrows 2—2 of Fig. 1.
Fig. 3 is a perspective view of a modification of the detector of Figs. 1 and 2.
Fig. 4 is a wiring diagram illustrating a modification of a portion of the invention.
Fig. 5 is a wiring diagram illustrating a modification of the device of Fig. 4.
Fig. 8A illustrates a modification of Fig. 8.

The detector 20 is a delicate switch mechanism including a contacting arm 21, pivoted intermediate its ends for rotation on a light suspension wire 22 which may be of phospor bronze or other suitable material, and disposed in the path of the thread. As best seen in Fig. 2, wire 22 is suspended between opposite arms of a U-shaped member 20$^1$ at the upper ends thereof. The arm 21 is provided at its upper end with a bifurcated portion or stirrup 23 which is so arranged that one arm of the stirrup is disposed on either side of the thread. The arms of stirrup 23 are separated by a distance slightly greater than the normal diameter of the thread so that any projecting portions of the latter resulting from defective filaments will engage one or the other or both of said arms. The other end of the arm 21, normally maintained in the position of Fig. 1 due to the torsion of wire 22, is adapted, when engaged by a defective filament, to engage a relatively fixed flexible contact element 24 disposed at right angles to the arm 21 and securely fastened at one end to a stationary rod member 25 which may be mounted in any suitable manner as for example on the rod 27. As defective filaments strike the stirrup 23 and rotate the arm 21 into engagement with the flexible contact 24, the suspension wire 22 sets up a resisting torque to thereby return the arm 21 to its normal position when the fuzz projections on the thread have passed on. The thread is guided into the stirrup 23 by guide rods 26 and 27 having saddle portions at their upper end for guiding the thread. The resiliency of contact 24 permits movement of the arm 21 to any position which may be taken by the latter. This is important to prevent injury to the thread or detector in the event that a knot or other unusually large projection from the thread engages the stirrup 23.

When the contacting arm 21 is rotated into engagement with the flexible contact 24, a circuit including the contacts will be completed for applying an alternating current potential to the input circuit of an electronic device 30. A relay winding 41 connected in the output circuit of the electronic device 30 is adapted to actuate a marker lever 43 pivoted at one end on a shaft 42. A print hammer 45, disposed on the other end of the member 43, is adapted to strike a recorder chart 50 through a suitable ribbon 51, and to thereby make a mark on the recorder chart each time that the relay winding 41 is energized. The member 43 is normally biased for rotation in a clockwise direction by spring means 44 into engagement with a stop 46, so that when the relay winding 41 is de-energized, the print hammer 45 is held out of engagement with the recorder chart 50 and ribbon 51. The recorder chart is adapted to be driven by a continuously rotating roller 52, the latter being driven in any convenient manner, as, for example, by a unidirectional electrical motor 53 through suitable gearing 53$^1$, so that any imperfections of the thread 11 will be recorded on the chart as a series of contiguous marks on a straight line.

As illustrated in Fig. 1, provision may advantageously be made for recording the imperfections in a plurality of threads simultaneously on a single recorder chart 50. For so recording the imperfections in a number of threads simultaneously, separate detector means 20 are arranged in the path of the individual threads, the said detectors being adapted to control a plurality of electronic circuits 30, each of the latter having a relay winding 41 disposed in the output circuits thereof and associated elements 43, 45, 50 and 51. As will be readily understood, the number of threads which may practically be simultaneously inspected in this manner is limited only by the width of the chart employed. Print hammers may conveniently be spaced at a small distance, say an eighth of an inch apart, and hence fifty or a hundred threads may simultaneously be inspected and a record of imperfections thereof had on a single record chart. For convenience in scanning the chart and noting the number of imperfections in any of the threads inspected by such a multiple unit, provision has been made in the form of a guide 54 disposed parallel to the chart roll 52, in close proximity therewith and slightly below the level of the print hammers. A sighting slide 55, having a slot 56 running lengthwise, is disposed at right angles to the guide 54 and is adapted to cooperate at its upper end with the latter so as to be manually slidable along the chart, and the marks in any single line may be seen through the slot 56. Preferably, each print hammer is consecutively numbered in either direction, as desired, on the guide 54, and the slot 56 extended so that the number may be seen therethrough, or a separate opening may be provided for this purpose, as desired. In this manner the marks denoting imperfections for any single thread may be scanned individually, in that the marks pertaining to other threads simultaneously inspected and in close proximity to those it is desired to scan are excluded from view and thereby precludes any confusion which might otherwise result in scanning the chart.

The electronic device 30 includes a transformer 60, having secondary windings 62 and 63, and a primary winding 61 energized from the alternating current supply lines L$^1$ and L$^2$.

The secondary winding 62 is employed to supply current for heating the filament of a three electrode thermionic tube 64, having the usual anode 65, grid 66 and cathode 67. The cathode 67 may be a filament type as shown in Fig. 1, the filament terminals being connected by conductors 68 and 69 to the transformer winding 62. The anode 65 is connected by a conductor 70 to one end of the relay winding 41 and the other end of the relay winding is connected by a conductor 71 to the alternating current supply line $L^1$, the anode circuit being completed by a conductor 72 connecting one end of the transformer secondary winding 62 to the alternating current supply line $L^2$. The cathode 67 is connected to one end of the secondary winding 63, and the remaining end of the latter is connected to the contacting arm 21 of the detector 20. The grid 66 is connected by a conductor 74 to the flexible contact 24 so that when the contacting arm 21 engages the contact 24, as a result of defective thread filaments striking the stirrup 23, the grid or input circuit of the electronic device 30 will be completed through the transformer secondary winding 63, and an alternating current voltage will be applied thereon. The operation of the electronic tube 64 is such that, when the arm 21 is out of engagement with the flexible contact 24, negligible current will flow in the anode circuit due to the accumulation of negative charges on the control grid 66 and the relay winding 41 will be de-energized. When an alternating current voltage is applied to the grid or input circuit, however, pulsating current will flow in the anode circuit of the tube 64 and the relay winding 41 will be energized. Thereupon, the lever 43 will be attracted and cause the print hammer 45 to strike the chart 50 and make a mark thereon. Each time that a defective thread filament strikes the stirrup 23, such a mark will be made on the chart 50 so that a record of the number of imperfections in the thread is had. If desired, a current measuring instrument 73 may be interposed in the anode circuit to indicate whenever a defective thread filament strikes the stirrup 23.

In Fig. 3 I have shown an alternative form of detecting switch mechanism in which a vane 20a, rigid with the arm 21, is adapted to move between the poles of a permanent magnet 20b. The permanent magnet 20b is mounted on a rod 20d, rigid with the frame member $20^1$. When defective thread filaments strike the stirrup 23, resulting in rotation of the contact arm 21, the torsional force, or torque of restitution exerted by the suspension wire 22 may cause the contact arm 21 to oscillate back and forth, but as the vane 20a oscillates between the poles of the permanent magnet 20b, magnetic action on the vane damps out the oscillation, whereupon the arm 21 is quickly restored to its normal position out of engagement with the flexible contact 24.

In Fig. 4, a modified form of the invention is illustrated in which the detector 20 is interposed in a circuit including a current limiting resistor R and a neon signal bulb N. Current is supplied to the circuit for energizing the neon signal bulb from the alternating current supply lines $L^3$ and $L^4$. The presence of defective thread filaments on the thread 11 will result in engagement of the arm 21 with the flexible contact $24^2$ to thereby complete the circuit to the neon signal bulb N, to energize the latter. The neon signal bulb N will then glow, flashing at a frequency twice that of the alternating current supply source due to the fact that each plate of the neon signal bulb flashes once during each cycle of the alternating current supply source, and will give such visual indication each time that defective thread filaments strike the stirrup 23. The magnitude of the voltage of the supply source is so chosen that it is high enough to cause initial flashing of bulb M. As is well known, the magnitude of voltage required to cause initial flashing of a neon lamp is higher than that required to maintain the flashing once it is started, but because of the fact that the internal resistance of such lamps increases as the current flow therethrough increases, a voltage high enough to cause initial flashing may be continuously impressed on the terminals of the bulb M without causing excessive flow of current through the bulb. The frequency of the alternating current supply may be suitably controlled or selected to provide the desirable frequency of flashing of the tube N.

In Fig. 5 I have shown a modification embodying my invention in which a cathode ray tube 80 is employed to indicate whenever defective thread filaments actuate the detector 20. The cathode ray tube 80 employed is comprised of the usual elements, a cathode 81, an anode 82 having a small aperture in the center thereof to permit a stream of electrons to pass through, a pair of condenser plates 83, and a fluorescent screen 84. A suitable direct current potential is maintained on the anode and current is supplied for heating the filament by means not shown. A continual stream of electrons passes from the cathode 81 to the anode 82, some of which pass through the small opening or aperture in the anode, and, due to their high velocity normally travel in a straight line between the condenser plates 83 to the screen 84, the latter becoming luminescent at the point at which the electrons strike. When an alternating current voltage is applied to the condenser plates 83, the electron stream will be deflected first in one direction and then the other at the frequency of the alternating current supply voltage resulting in a luminescent line appearing on the screen 84. According to my invention I apply an alternating current voltage to the condenser plates 83 whenever defective thread filaments strike the stirrup 23 and thereby close the arm 21 into engagement with the contact 24.

The means by which the alternating current voltage is applied to the condenser plates 83, as illustrated, more or less diagrammatically, in Fig. 5, include two heater type three-electrode electronic tubes 90 and 91, including the usual anodes, 92 and 93, grids 94 and 95, and cathodes 96 and 97, respectively. The cathodes 96 and 97 are connected in opposite arms of a Wheatstone bridge network, the two remaining arms of the bridge consisting of equal resistances 98 and 99, the latter being connected to the alternating current supply line $L^2$. The cathodes 96 and 97 are connected through a grid biasing resistor 100 to the alternating current supply line $L^1$. The condenser plates 83 of the cathode ray tube are connected between the anodes 92 and 93 on which equal potentials are maintained when the bridge is balanced so that normally both of the condenser plates are at the same potential and the electronic stream is permitted to pass through them undisturbed. The grids 94 and 95 are connected to the alternating current supply line $L^1$, the former being connected thereto through a one megohm resistor 101. The grid 94 is connected also to the flexible contact 24 by a conductor 102 and the contacting arm 21 is connected by a conductor 103 directly to the cathodes 96 and 97. The resistor 100 provides a negative bias for both grids 94 and 95, so that both tubes 90 and 91 normally are equally conductive. Upon engagement of the arm 21 with the flexible contact 24, resulting from defective thread filaments striking the stirrup 23, however, the grid 94 is connected directly to the cathode 96 and the potential thereon is raised to that of the cathode potential, whereupon the resistance of the tube 90 to the flow of anode current decreases and the bridge becomes unbalanced. Since the current supplied to the bridge by the supply lines $L^1$ and $L^2$ is alternating, the currents conducted by the tubes 90 and 91 will be pulsating and bridge unbalance will result in an alternating voltage being applied to the condenser plates 83. This alternating voltage on the plates 83 deflects the cathode ray stream in a manner hereinbefore described and a straight line appears on the fluorescent screen 84. Such visual indication is had each time that defective thread filaments strike the stirrup 23 of the delicate switch mechanism 20.

Figure 6:
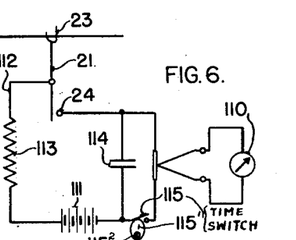
Fig. 6 is a wiring diagram illustrating another embodiment of the invention.

In Fig. 6, I have shown another embodiment of my invention in which repeated impacts of defective filaments on the detector 20 are employed to charge a condenser, the latter being periodically discharged and the discharge current measured in any suitable manner. The positive terminal of a battery 111 is connected through a resistor 113 by a conductor 112 to the contacting arm 21 so that engagement of the latter with the flexible contact 24 results in a charge being imparted to a condenser 114, the magnitude of this charge depending upon the number of such engagements and hence upon the number of imperfections in the thread. Periodically, the condenser 114 is discharged by closure of a switch 115 which may be actuated by means of any suitable time actuated mechanism. Preferably, I employ intermittently operating discharge means providing equal intervals of time between each discharge period, which, as diagrammatically shown, includes a cam 115$^1$ driven by continuously rotating shaft 115$^2$ for operating switch 115 alternately to its open and closed positions. The discharge current may be measured in any convenient manner, as for example, by a hot wire or other suitable current measuring instrument 110. Obviously, the magnitude of the discharge current will be a measure of the number of engagements of the arm 21 with the contact 24, and hence, the number of imperfections in the thread occurring in the interval that the switch 115 is open.

Figure 7:
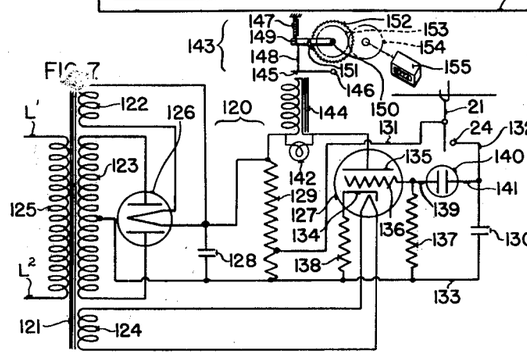
Fig. 7 is a modification of the device of Fig. 6.

In Fig. 7 I have shown a modification of the embodiment described in Fig. 6 in which repeated engagements of the flexible contact 24 by the contacting arm 21 are employed to charge a condenser 130, the latter being automatically discharged when the charge stored up exceeds a certain predetermined value. This discharge current is employed to control the flow of anode current in an electronic device 120 to thereby effect indication, and, if desired, recording, each time a predetermined number of engagements of fuzz projections with the detector 20 have occurred.

The electronic device 120 includes a transformer 121, having secondary windings 122, 123, 124, and a primary winding 125 energized directly from the alternating current supply lines $L^1$ and $L^2$. The secondary windings 122 and 124 supply current for heating the filaments of electronic tubes 126 and 127, and the winding 123 supplies anode voltage to the tube 126. The tube 126 is a full wave rectifier tube, the rectified voltage being impressed on the anode circuit of the triode 127. A condenser 128 and a divider resistor 129 are employed in the usual manner for smoothing out alternating current ripples in the rectified voltage. A portion of the rectified voltage from the tube 126 is also employed for imparting a charge to the condenser 130 each time that the contacting arm 21 engages the flexible contact 24. A conductor 131 connected to the contacting arm 21 at one end is connected to the resistor 129 at a position thereon for imparting a suitable charge to the condenser 130, the latter having one terminal thereof connected by a conductor 132 to the flexible contact 24 and the other terminal connected by a conductor 133 to the negative side of the resistor 129. The tube 127 is a heater type tube and is comprised of the usual cathode 134, anode 135, and grid 136, the latter being connected through a resistor 137 to the conductor 133. Negative bias is provided for the grid 136 by means of a resistor 138 connected in the cathode circuit so that normally the tube is non-conductive. A gaseous discharge tube 140 is connected by conductors 139 and 141 between the grid 136 and the conductor 132. This tube 140 has a current-voltage characteristic such that up to a certain voltage across the tube no current flows, but when the striking potential is reached, a discharge passes and the voltage across the tube drops and becomes quite constant regardless of the current taken from the tube. When the charge accumulated on the condenser 130, as a result of repeated engagements of the contacting arm 21 and contact 24, exceeds a predetermined value, a discharge passes between the elements in the tube 140 and through the resistor 137 back to the other plate of the condenser. The potential difference momentarily maintained across the resistor 137 by the discharge current reduces the negative bias on the grid 136 to thereby render the tube 127 conductive. The anode current conducted by the tube may be employed in any suitable manner to afford indication and, if desired, to effect a recording operation each time that a predetermined number of engagements of the contacts 21 and 24 have occurred.

As shown in Fig. 7, a lamp 142 connected in the anode circuit of the tube 127 is provided for indicating whenever a predetermined number of fuzz projections have passed the detector 20. Integrating means 143 have also been provided for recording the number of such imperfections. The means 143 may advantageously be actuated by a relay 144 connected in parallel or in series, as desired, with the lamp 142. An armature 145 pivoted for rotation at 146 and biased for rotation in a clockwise direction by spring means 147 is disposed in inductive relation to the relay 144 so that when the latter is energized the armature will be rotated counterclockwise into engagement with the relay. The armature 145 is connected by means of a link 148 to one end of a lever 149 pivoted for rotation at the other end on a shaft 150 and carrying a pawl 151 intermediate its ends. This pawl 151 is adapted to cooperate with a ratchet wheel 152 also mounted for rotation on the shaft 150. A gear 153 integral with the ratchet wheel 152 is adapted to cooperate with a gear 154 connected in any suitable manner to a counter 155 so that rotation of the ratchet wheel 152, as a result of energization of the relay 144, results in actuation of the counter to thereby record the total number of engagements of fuzz projections with the detector 20. It is not to be construed, however, that the embodiment of the invention described in Fig. 7 is limited to the recording means shown, for any suitable recording means may be employed, as for example, described elsewhere herein.

Figures 8, 9, 10:
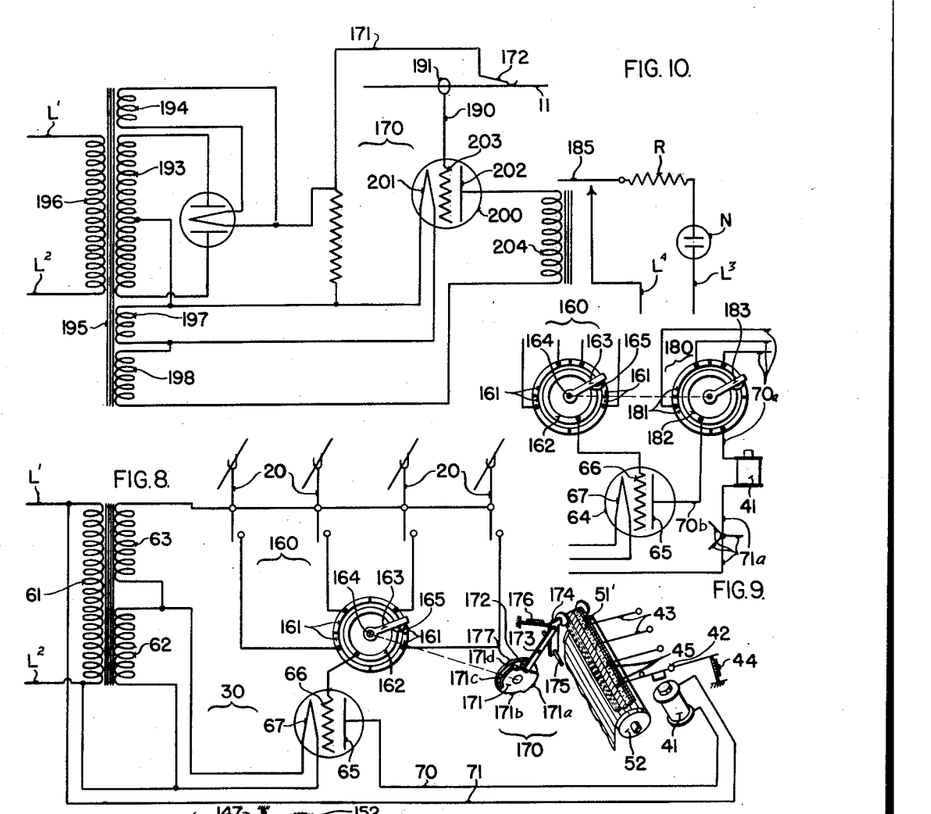
Fig. 8 is a wiring diagram illustrating a modification of the device of Fig. 1.
Fig. 9 is a wiring diagram illustrating a further modification of the device of Fig. 1.
Fig. 10 is a wiring diagram illustrating still another embodiment of the invention.

In Fig. 8 I have illustrated another embodiment of my invention in which a plurality of detectors may successively be connected to a single sensitive electrical circuit for controlling the latter and recording the imperfections in the thread. In some textile inspection operations for detecting broken thread filaments, it may be sufficient to record only the imperfections in a portion of the thread on each of a number of spindles in order to obtain a reliable record of the state of perfection thereof and under such circumstances a reduction in the amount of equipment employed may be effected. As shown in Fig. 8, a detector 20 is provided for each of a plurality of threads, and a common amplifier 30 and a recorder element 43 are provided for all of the detectors. A plurality of recorder elements 43 may be provided as illustrated so that the imperfections detected by a plurality of detectors 20 may be recorded on a single record chart. To effect cooperation of each individual detector 20 with the common recorder means, a rotary switch 160 and a cam operated mechanism 170 are provided for successively connecting the grid 66 to each of the detectors 20 and for simultaneously moving a different colored section of a multi-colored marker ribbon 51¹ under the print hammers 45, respectively. Actuation of each detector 20 by defective filaments in each of the corresponding threads will then result in a different colored mark being made on the record chart to thereby facilitate the scanning or reading of the latter at the end of the inspection operation.

The rotary switch 160 referred to above includes a plurality of arcuate segments 161 which are insulated from each other in any suitable manner, a conducting ring 162 insulated from each of the arcuate segments, and a distributor arm 163 mounted on a shaft 164. The distributor arm 163 is provided with a brush 165 insulated therefrom and adapted to connect the arcuate segments 161 in succession with the conducting ring 162. The shaft 164 is rotated in a counter-clockwise direction in a suitable manner at uniform speed and connects each detector 20 successively with the electronic device 30 and associated recording means 43.

The cam operated mechanism 170 referred to above for moving a different colored section of the multi-colored ribbon 51¹ under the print hammers 45 includes a cam 171 which is mounted for rotation on the shaft 164 and is integral therewith. The cam 171 is so configured as to provide edge segments 171a, 171b, 171c, and 171d which are adapted to cooperate with a roller 172 on one end of an arm 173. The arm 173 is rigid with a ribbon guide roll lever 174 which is pivoted for rotation on a shaft 175 and is biased for rotation in a counter-clockwise direction by spring means 176 so that the roller 172 on the end of the arm 173 is held into engagement with the edge of the cam 171. A disc 177 mounted for rotation on the shaft 164 and integral with the cam 171 is provided for guiding the roller 172 in order to prevent the latter from sliding off the edge of the cam. If desired, two such discs 177 on opposite sides of the cam may be employed for this purpose.

As seen in Fig. 8, when the cam 171 rotates in the counterclockwise direction, the roller 172 will engage and then leave the province of edge segments 171a, 171b, 171c, and 171d in succession to impart a series of rotational impulses in the counterclockwise direction to the lever 174 and thereby move the various sections of the multi-colored ribbon 51¹ under the print hammers 45 in succession. At the end of one complete cycle of rotation of the cam 171, the roller 172 will engage a rise portion on the edge of the cam between the segments 171a and 171d to thereby quickly move the ribbon 51¹ to an extreme position towards the right. The extreme section of the ribbon 51¹ to the left as seen in Fig. 8 will then be disposed under the print hammers 45 and the system will be ready for the start of a new cycle. As the distributor brush arm 163 of the rotary switch 160 moves from one arcuate segment to the next, the next succeeding detector 20 will be connected to the grid 66 of the electronic device 30 and simultaneously the correspondingly colored section of the ribbon 51¹ will be moved under the print hammers 45 so that imperfections in each of the individual threads will be recorded in marks of identifying color and, therefore, will be readily distinguishable. The electronic device 30 and the cooperating individual detector and recorder when connected are adapted to operate in a manner similar to that described in Fig. 1 for recording imperfections in the thread, and may be identical in construction to the correspondingly identified parts of Fig. 1.

If desired, the cam operated means 170 described above may be dispensed with and the marks due to imperfections in each of the threads may be recorded, as illustrated more or less diagrammatically in Fig. 8A, in equally spaced divisions running transverse on the chart 50, the latter being driven in synchronism with the rotary switch 160. For facilitating the scanning of the chart at the end of the inspection operation, each of the chart divisions may be numbered to correspond with a detector 20 as illustrated so that, as the latter are successively connected to the recorder means, the imperfections in each of the individual threads will be recorded in a division of the chart numbered to correspond therewith.

In Fig. 9 I have illustrated a modification of Fig. 8 in which individual detector and recorder means are provided for each of a plurality of threads and a common amplifier 30 is provided for all of the units. The imperfections in each of the threads will then be recorded on separate straight lines as a series of contiguous marks. In order to effect cooperation of the individual detector 20 with its corresponding recorder means 43, I provide two rotary switches 160 and 180 mounted on the same shaft for successively connecting in synchronism the grid 66 of the tube 64 to each of the detectors 20 and the anode 65 to each of the relays 41, respectively. The rotary switch 180 may be similar in construction to the rotary switch 160, and includes a plurality of arcuate segments 181, a conducting ring 182 and a distributor arm 183 mounted on the shaft 164 for rotation therewith. Each of the arcuate segments is connected to one end of the winding of relay 41 by a conductor 70a, the other ends of the relay windings being connected together and to the alternating current supply line L¹ by a conductor 71a. The conducting ring 182 is connected to the anode 65 of the electronic device 30 by a conductor 70b so that as the detectors 20 are successively connected to the grid 66, a corresponding relay 41 and its associated recording elements are simultaneously connected to the anode 65 for recording the imperfections in the thread detected by the detector 20 then connected to the grid.

For convenience in reading the record chart at the end of the inspection operation, the print hammers 45, as seen in Fig. 8, may be staggered, and the means described in Fig. 9 may be employed in conjunction therewith to record the imperfections in each of a plurality of threads by different colored contiguous marks, the marks in any one line, and hence, for any individual thread, being of the same color.

In Fig. 10, I have illustrated a further modification of my invention in which defective thread filaments are detected by arranging an electrical conductor 190 in the path of the thread. This electrical conductor 190 preferably has a loop 191 at the upper end thereof through which the thread is passed, and is adapted to receive an electrical charge from the thread when broken filaments engage the loop. This charge imparted to the electrical conductor is employed to control a sensitive electrical circuit to thereby indicate and/or record the imperfections in the thread.

In Fig. 10, as illustrated, means are provided in the form of an electronic circuit 170 for imparting a charge to the moving thread immediately before it passes through the loop 191, and for detecting when part of the charge is imparted to the loop by defective thread filaments. This electronic circuit includes a rectifier circuit which is capable of delivering a high direct current potential, the positive side of which is connected by a conductor 171 to a brush 172, the latter being in engagement with the moving thread 11 and being adapted to impart a charge thereon. The rectifier circuit is energized from secondary windings 193 and 194 of a transformer 195, the primary 196 of which is energized from the alternating current supply lines L¹ and L². Secondary windings 197 and 198 are also disposed on the transformer 195 and are employed for supplying current for heating the filament and anode voltage to a three-electrode electronic tube 200. The tube 200 includes the usual cathode 201, anode 202, and grid 203, the latter being connected to the conductor 190. A relay winding 204 is connected in the plate circuit of the tube 200 and is adapted to operate an armature 185 to close a circuit through a neon tube N connected through a resistance R to the alternating current supply lines L³ and L⁴. It will be understood that the relay winding 204 may be employed to control a recording operation as disclosed in Figs. 1 and 8, if desired The characteristics of the tube 200 may be similar to the tube 64 described in Fig. 1 in that normally the tube is non-conductive. When a positive charge is imparted to the grid 203 as a result of engagement of a broken thread filament with the loop 191, the tube 200 will become conductive during the half cycle when the anode 202 is positive, and pulsating current flowing through the relay winding 204 will energize the latter and thereby effect indication or recording of the thread imperfections, as desired.

Figure 11:
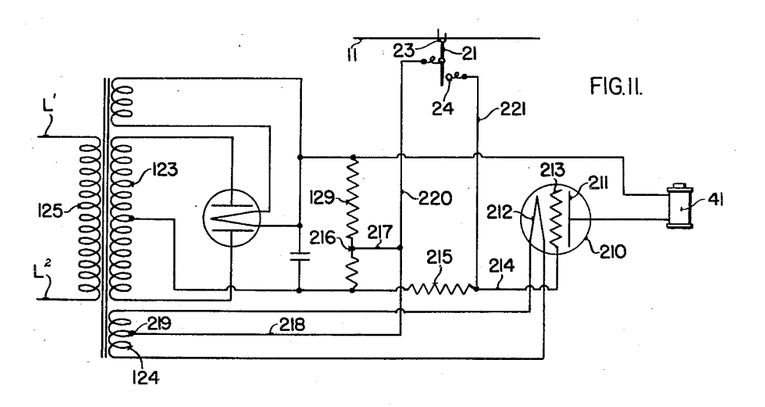
Fig. 11 is a wiring diagram illustrating another modification of the device of Fig. 1.

In Fig. 11, I have illustrated an alternative amplifier circuit which may be used in conjunction with the detecting and recording means of Figs. 1, 8, or 9. As shown in Fig. 11, a rectifier, which may be similar to the rectifier of Fig. 7, is employed for supplying direct current anode voltage to an electronic tube 210, the latter desirably taking the form of a triode comprising an anode 211, a cathode 212, and a grid 213. The tube 210 is normally biased beyond cut-off, but upon engagement of the contacting arm 21 and the contact 24 resulting from impact of defective filaments on the stirrup 23, the bias voltage is removed and the tube 210 is thereby rendered conductive. When the tube 210 is so rendered conductive, the recording means 41 disposed in the output circuit thereof is energized and actuates the lever 43, as described in connection with Fig. 1 for marking a dot on the chart 51, to record the presence of the defective filaments.

The means by which the tube 210 is biased beyond cut-off includes a circuit connecting the grid 213 to the voltage divider 129 at a point thereon which is negative with respect to the point of connection of the cathode 212 thereto. This circuit includes the grid 213, conductor 214, current limiting resistor 215, the negative side of the voltage divider 129, tap 216 on the voltage divider 129, conductor 217, conductor 218, a center tap 219 on the transformer secondary winding 124, and the cathode 212. The cathode 212 is connected to the contacting arm 21 through the transformer secondary winding 124, conductor 218 and conductor 220; and the grid 213 is connected to the flexible contact 24 through conductor 214 and a conductor 221 so that engagement of the contacts 21 and 24 results in the potential on the grid 213 being raised to that of the cathode 212 to thereby render the tube 210 conductive.

In some inspection operations for detecting defective thread filaments, it may be sufficient to record only the imperfections which pass the detecting means every minute or so to obtain a reliable record of the state of perfection thereof, the actual number of imperfections in the thread being of minor importance, and under such circumstances a material reduction in equipment may be effected. As one means for so detecting and recording the presence of defective filaments in the thread, I employ a detecting switch mechanism which is actuated by impact of defective filaments to close an energizing circuit for recording the thread imperfections and maintain this energizing circuit in such closed condition until auxiliary means have been energized for restoring the detecting means to its normal open position. The means for recording the presence of defective filaments in the thread under inspection which have been described in Figs. 1, 8 and 9 have relied for operation upon response of the recording means 41 to the closure of the contacts 21 and 24 which remain in engagement for only a short period of time and under some circumstances engagement of the contacts 21 and 24 for a period of such short duration may be undesirable. If so desired, the period of engagement of the contacts 21 and 24, initiated by impact of defective filaments on the stirrup 23, may be made longer and the contacts 21 and 24 may be separated after the recording operation has taken place. Alternative means for so detecting and recording the presence of defective filaments have been illustrated in Figs. 12 and 13.

Figure 12:
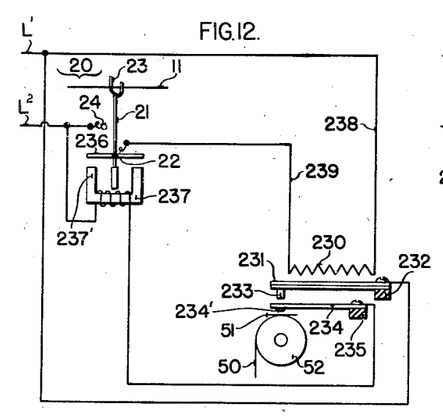
Fig. 12 is a wiring diagram illustrating a modification of the contacting switch member shown in Fig. 1.

In Fig. 12, as illustrated, the detecting mechanism 20 operates to close a circuit for energizing a heating coil 230 when defective filaments engage the stirrup 23. The heating coil 230 is disposed on a bi-metallic strip 231 which is mounted at one end on an insulated bracket 232 and has a pin 233 disposed on the other end which is adapted to engage one end of a spring marker arm 234. The spring marker arm 234 is mounted at its other end on an insulated bracket 235 and is adapted, when engaged by the pin 233, to have a marking pin 234[1], disposed on its movable end, pressed into engagement with the ribbon 51 and the chart 50 for recording each such engagement.

The contacts 21 and 24 which are closed by impact of defective filaments with the stirrup 23 are maintained in such closed relation by a magnetic vane 236 which is rigid with the arm 21 and whose ends are disposed in inductive relation with the poles of a U-shaped, normally deenergized relay 237. When defective filaments actuate the contacting arm 21, one end of the vane 236 engages a leg 237[1] of the relay 237 and residual magnetism in the vane 236 holds the latter in engagement with the leg 237[1] to thereby maintain the contacting arm 21 in engagement with the contact 24, resulting in energization of the heating coil 230. The energizing circuit for the heating coil 230 includes supply conductor $L^1$, conductor 238, heating coil 230, conductor 239, contacting arm 21, contact 24, and supply conductor $L^2$. Subsequent warping of the bi-metallic strip 231, caused by the heating of coil 230, presses the pin 233 into engagement with the spring marker 234 to thereby cause a record to be made of the closure of contacts 21 and 24, and to close an energizing circuit from the supply lines $L^1$ and $L^2$ to the relay 237 for separating the contacts 21 and 24. When the relay 237 is energized, it attracts both ends of the vane 236 equally and causes the contacting arm 21 to move out of engagement with the contact 24 to a normal open circuit position. The resulting deenergization of the heating coil 230 permits the bimetallic strip 231 to cool, and subsequent return movement of the latter to its normal position as shown in Fig. 12 breaks the contact between the spring marker arm 234 and the bimetallic strip 231 to deenergize the relay 237.

Figure 13:
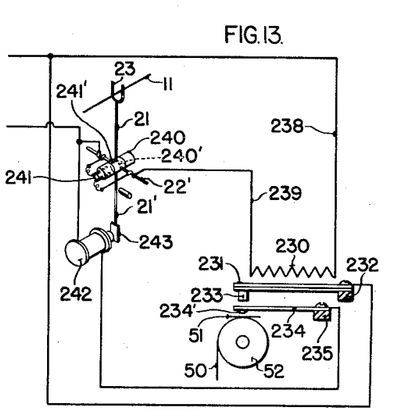
Fig. 13 is a wiring diagram illustrating a modification of the contacting switch member of Fig. 12.

In Fig. 13, I have illustrated an alternative form of switch contacting mechanism which may be employed in conjunction with the recording means of Fig. 12. As shown in Fig. 13, a delicately balanced mercury switch 240, comprising an elongated envelope having a pair of contacts 241 disposed in one end, is pivoted for rotation on a metal suspension wire 22[1] which desirably is a torsionless suspension. A contacting arm which may be similar to the contacting arm 21 of Fig. 2, is mounted on the elongated envelope of switch 240 by means of a light metal band 241[1], as shown, and upon impact of defective filaments with the stirrup 23, is adapted to overbalance the mercury switch 240, tilting the latter in a counter-clockwise direction to close the contacts 241. The mercury switch 240 remains in this tilted position due to the weight of the mercury 240[1], until a relay 242 is subsequently energized to restore the mercury switch 240 to its normal open position. The manner in which the relay 242 is energized may be similar to the manner in which the relay 237 of Fig. 12 is energized. The relay 242 is adapted to cooperate with a magnetic vane 243 rigid with an arm 21[1] which is connected to the metal band 241[1] at a point diametrically opposite the point of connection of the contacting arm 21 thereto, so that, when the relay 242 is energized, the vane 243 is attracted and causes rotation of the mercury switch 240, restoring the latter to its normal balanced position to thereby open the energizing circuit to the heating coil 230 at the contacts 241.

In Figs. 12 and 13 inertia of the heating coils 230 and/or the bimetalic strips 231 causes the marking pins 234[1] to remain momentarily in contact with the ribbon 51 and chart 50 after the heating coils 230 are deenergized so that the thread imperfection is recorded as a short line. If successive defective filaments engage the stirrups 23 immediately thereafter, the heating coils 230 will be further energized and cause the marking pins 234[1] to remain in engagement with the ribbon 51 and chart 50 for a longer period of time to thereby record the passage of the additional number of thread imperfections by a longer line.

Figures 14, 15:
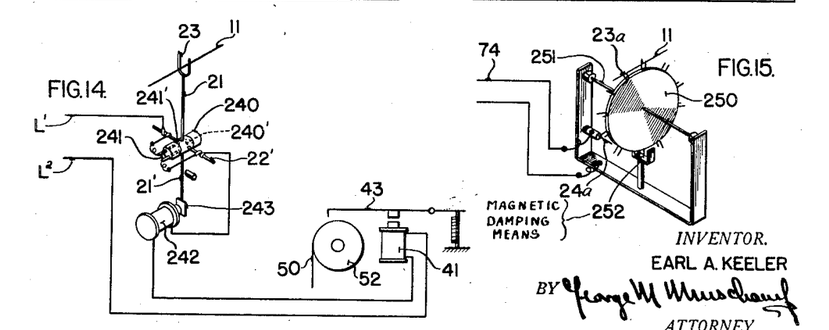
Fig. 14 is a wiring diagram illustrating a further modification of the device of Fig. 1.
Fig. 15 is a perspective view of a further modification of the contacting switch member of Fig. 1.

In Fig. 14, I have shown a further modification of Fig. 1 in which the recording means 41 of Fig. 1 are used in conjunction with the detecting means of Fig. 13. As shown in Fig. 14 rotation of the delicately balanced switch mechanism 240 to its on position by impact of defective filaments on the stirrup 23 results in the energization of the recording relay 41 and the restoring relay 242 which are series connected through the contacts 241 of the mercury switch 240 to the supply lines $L^1$ and $L^2$. For recording the presence of defective filaments and subsequently restoring the detecting mechanism to its normal position, the recording relay 41 is adapted to actuate the lever 43 before the relay 242 responds to the energizing current and causes rotation of the mercury switch 240 to its normal balanced position. Closure of the mercury switch contact 241 thereby results in a mark being made on the chart 50 and immediately thereafter restoration of the mercury switch to its balanced open circuit position.

In Fig. 15 I have illustrated a further modification of the detecting switch mechanism of Figs. 2 and 3, which may be used in conjunction with the indicating or recording means described in connection with these types of detectors. As shown in Fig. 15, this alternative form of detecting switch mechanism comprises a circular disc 250 which is rigidly mounted on a torsionless suspension wire 251, and has a plurality of equally spaced stirrups 23a, which desirably are of magnetic material, disposed on the periphery thereof. The circular disc 250 is so disposed relatively to the moving thread 11, which is under inspection, that when defective filaments engage a stirrup 23a, the disc 250 is given rotational movement. A resilient wire 24a is so disposed in relation to the stirrups 23a, that when the disc rotates, the stirrups 23a will engage the flexible contact 24a. Further movement of the disc 250 will result in the engaging stirrup 23a bending the flexible contact 24a until the latter slides out of engagement therewith. Means are further provided for so braking the disc 250 that immediately thereafter the disc 250 will come to rest with the contact member 24a disposed intermediate adjacent stirrups 23a and out of engagement therewith. In order that the arc through which the disc is so rotated may be limited to the angular distance between adjacent stirrups 23a, a U-shaped permanent magnet 252 is so arranged in relation to the stirrups 23a that the stirrups are adapted to move between the poles thereof, and when the disc 250 is at rest one of the stirrups will be disposed between said poles.

In the normal position as shown in Fig. 15, a stirrup 23a is in cooperative relation with the moving thread 11 and a diametrically disposed stirrup 23a is in cooperative relation with the permanent magnet 252. Due to the magnetic action of the magnet 252, an attracting force is exerted upon the stirrup 23a cooperating therewith so that the disc 250 is held stationary. Impact of defective filaments with the stirrup 23a, which is at that time cooperating with the moving thread, imparts a rotational movement to the disc 250 which overcomes the force of magnetic attraction of the magnet 252. The disc 250 then rotates until the succeeding stirrup 23a comes within the province of the magnetic force exerted upon the disc 250 and the disc 250 comes to rest with this succeeding stirrup 23a disposed between the poles of the magnet 252. If an abnormally large thread imperfection should engage the stirrup 23a then cooperating with the thread, a greater rotational movement will be imparted to the disc 250 and several stirrups 23a may pass between the poles of the magnet 252 before the disc 250 is brought to rest. When employed in conjunction with the recording means of Figs. 1, 8, 9 or 11, a record may then be had of the passage of the abnormally large thread imperfection.

As shown in Fig. 15, the contact member 24a may be connected to the grid 66 and the suspension wire 251 may be connected to the transformer secondary winding 63 of the amplifier 30 of Fig. 1 in a manner similar to that in which the contact 24 is connected to the grid 66 and the contacting arm 21 is connected to the transformer secondary winding 63 in Fig. 1. Impact of defective filaments on a stirrup 23a will then result in rotational movement of the disc 250 and subsequent engagement of a stirrup 23a with the resilient contact 24a to thereby vary the output current in the amplifier 30 for recording the presence of the thread imperfection. If an abnormally large thread imperfection engages a stirrup 23a, several of the stirrups may engage the resilient contact 24a and result in several closely spaced marks or dots being made on the chart 50 to thereby provide a record of the passage of such an abnormal thread imperfection.

While in accordance with the provisions of the statutes I have illustrated and described preferred embodiments of the present invention, those skilled in the art will understand that changes may be made in the form of the apparatus disclosed without departing from the spirit of the invention as set forth in the appended claims, and that some features of the present invention may sometimes be used with advantage without a corresponding use of other features.

Having now described my invention what I claim as new and desire to secure by Letters Patent is:

1. In apparatus for detecting defective filaments in a thread, detecting means disposed in cooperative relation with said thread, a device responsive to contact of defective filaments with said detecting means, and means for relatively moving said thread and said detecting means for causing said defective filaments to contact said detecting means.

2. In apparatus for ascertaining the number of imperfections in a thread due to defective filaments, detecting means disposed in cooperative relation with the thread, means for relatively moving said thread and detecting means, and means responsive to impacts of defective filaments with said detecting means for indicating each such impact.

3. In apparatus for detecting defective filaments in a thread, a light arm pivoted intermediate its ends for rotation and adapted to be engaged at one end and rotated by defective filaments in said thread and adapted to engage an electrical contact with its other end, and a torsional suspension adapted to form the pivot for said arm and normally hold the latter out of engagement with said electrical contact.

4. In apparatus for detecting defective filaments in a thread, a light arm pivoted intermediate its ends for oscillation and adapted to be engaged at one end and rotated by defective filaments in said thread and adapted to engage an electrical contact with its other end, means for biasing said arm away from engagement with said electrical contact and means for damping the oscillation of said arm.

5. The combination of claim 4 in which the damping means includes a magnet arranged adjacent said arm tending to prevent rotation of the latter.

6. In apparatus for detecting defective filaments in a thread, an electronic valve comprising an anode, grid and a cathode, a source of current supply for said valve, detecting means disposed in cooperative relation with said thread and said grid to control the latter and thereby control the passage of electric current through said valve in response to defective filaments in said thread and means responsive to said current.

7. In apparatus for detecting defective filaments in a thread, detecting means disposed in cooperative relation with said thread, means for relatively moving said thread and detecting means to cause impact of defective filaments with said detecting means, means responsive to such impact including an electronic valve comprising an anode, grid and a cathode, and a relay connected in a closed circuit including said anode and cathode.

8. In apparatus for ascertaining the number of imperfections in a thread due to defective filaments, an electronic valve comprising an anode, grid and a cathode, a source of alternating current voltage for said valve, detecting means disposed in cooperative relation with said thread comprising a delicate contacting arm pivoted for rotation intermediate its ends on a fine suspension wire, and adapted to engage a flexible contact at one end and having a stirrup at the other end adapted to be engaged by defective filaments, means for relatively moving said thread and stirrup for causing impact of defective filaments with said stirrup for rotating the contacting arm into engagement with said flexible contact to close an electrical circuit including the grid and cathode of said valve for controlling the flow of electric current through said valve, and means responsive to said electric current for indicating each such engagement.

9. In apparatus for ascertaining the number of imperfections in a plurality of threads due to defective filaments, an electronic valve comprising an anode, grid and a cathode, a source of alternating current voltage for said valve, a plurality of detecting means each disposed in cooperative relation with an individual thread, the said detecting means each comprising a delicate contacting arm pivoted intermediate its ends for rotation on a fine suspension wire and adapted to engage a flexible contact at one end and having a stirrup at the other end adapted to be engaged by defective filaments, means for relatively moving said thread and detecting means to cause impact of defective filaments with said stirrup, means for successively connecting each of said detecting means in an electrical circuit including the grid and cathode of said electronic valve for controlling the flow of electric current through said valve under control of the defective filaments of one of said threads when the detecting means individual thereto is connected in said circuit, and means responsive to said electric current for indicating each such thread imperfection.

10. In apparatus for ascertaining the number of imperfections in a plurality of threads due to defective filaments, an electronic valve comprising an anode, grid and a cathode, a source of alternating current voltage for said valve, a plurality of detecting means each disposed in cooperative relation with an individual thread, means for relatively moving said thread and detecting means to cause impact of defective filaments with said detecting means, a single indicating means connected in the anode circuit of said valve, the said indicating means being adapted to cooperate with distinguishing means, means for successively connecting each of said detecting means in a circuit including the cathode and grid of said valve for controlling the flow of electric current through said valve when defective filaments engage said detecting means, and means for simultaneously actuating said distinguishing means so that an indication individual to each detector is made by said indicating means as each of said detecting means is connected in said circuit.

11. In apparatus for detecting defective filaments in a thread, a circular disc pivoted for rotation at its center and having a plurality of stirrups disposed on the circumference thereof which are adapted to be engaged by defective filaments to rotate said disc, a resilient electrical contact adapted to be engaged by said stirrups in succession, and means actuated upon engagement of said contact by one of said stirrups.

12. In apparatus for ascertaining the number of imperfections in a plurality of threads due to defective filaments, a plurality of detecting means each disposed in cooperative relation with an individual thread, the said detecting means each comprising a delicate contacting arm pivoted intermediate its ends for rotation on a fine suspension wire and adapted to engage a flexible contact at one end and having a stirrup at the other end adapted to be engaged by defective filaments, means for relatively moving said thread and detecting means to cause impact of defective filaments with said stirrup, a plurality of means each responsive to engagement of tthe individual arms and contacts of said detecting means, and means under control of said responsive means for indicating each such engagement.

EARL A. KEELER.